Figure 1:
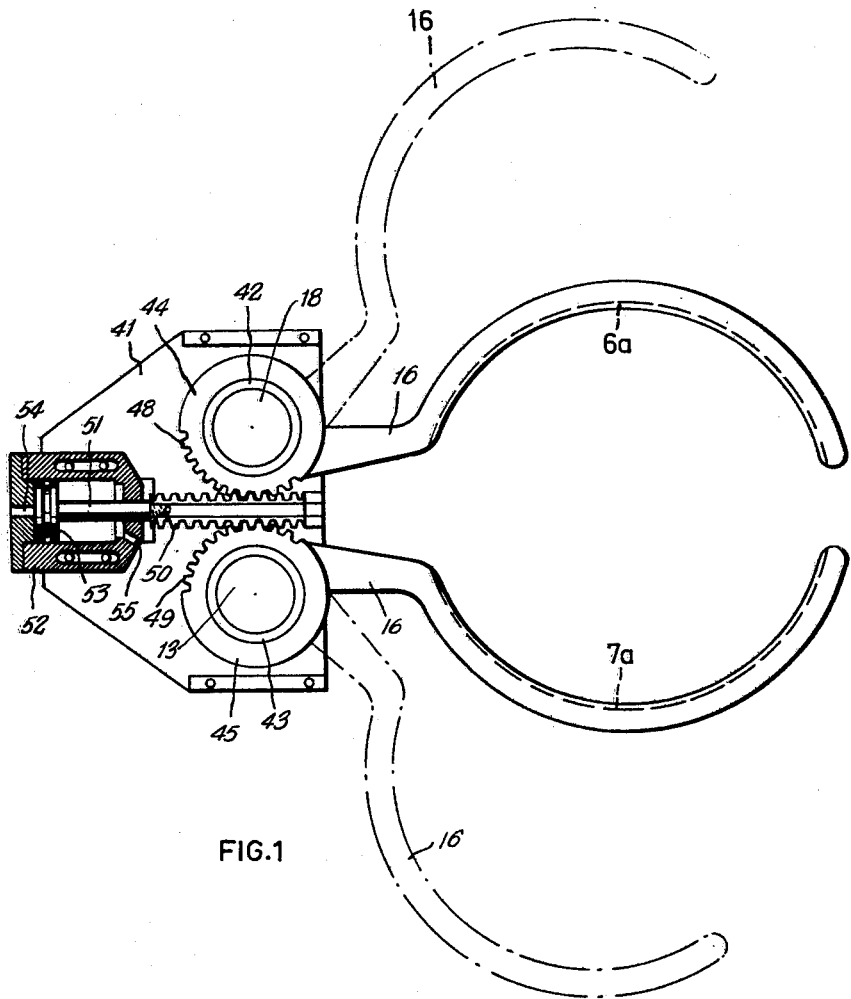

March 26, 1963 N. A. BORGLIN ETAL 3,082,811
APPARATUSES FOR PLACING AND POSITIONING BEAD
CORES IN TIRE BUILDING MACHINES
Filed March 6, 1961 2 Sheets-Sheet 1

INVENTORS
NILS A. BORGLIN and ANDERS M. E. APPELGREN

By Nenderoth, Lind & Ponack
ATTORNEYS

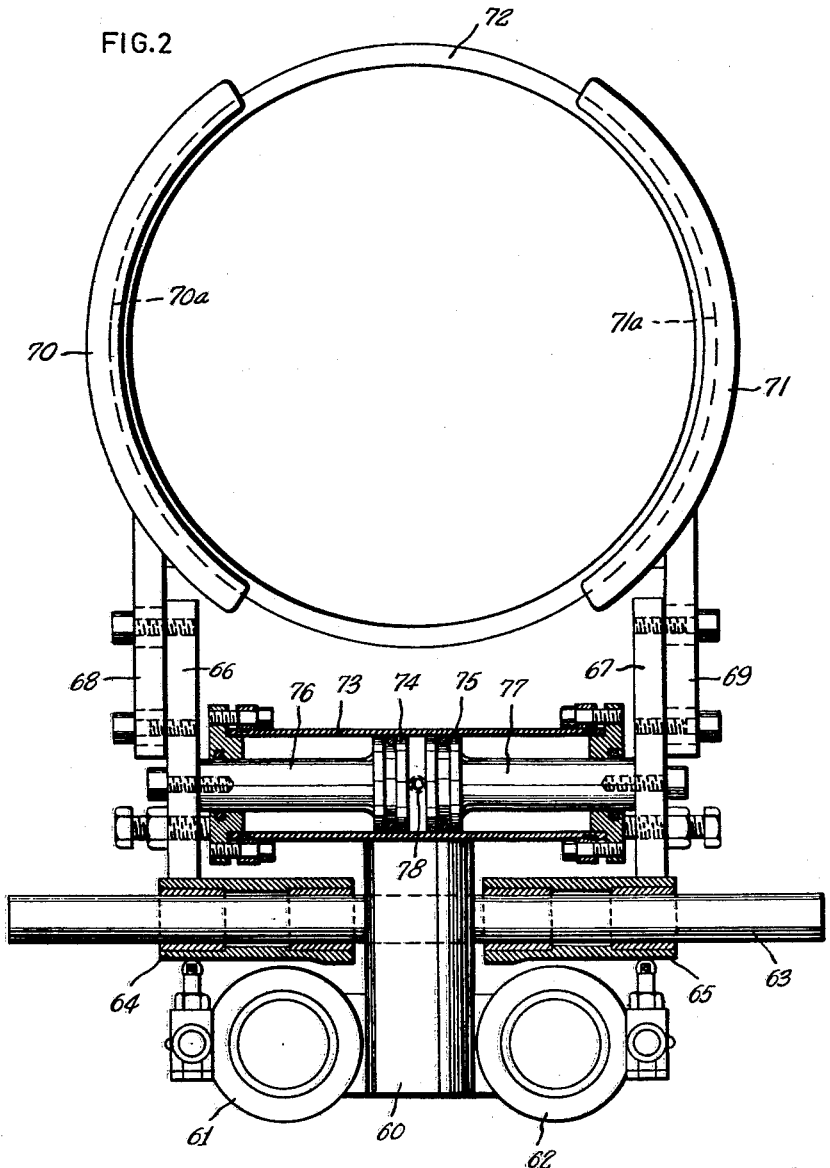

United States Patent Office 3,082,811
Patented Mar. 26, 1963

3,082,811
APPARATUSES FOR PLACING AND POSITIONING BEAD CORES IN TIRE BUILDING MACHINES
Nils Axel Borglin and Anders Mats Erik Appelgren, Trelleborg, Sweden, assignors to Trelleborgs Gummifabriks Aktiebolag, Trelleborg, Sweden, a corporation of Sweden
Filed Mar. 6, 1961, Ser. No. 93,727
Claims priority, application Sweden Apr. 8, 1960
4 Claims. (Cl. 156—403)

This invention relates to an apparatus for placing and positioning bead cores in tire building machines, which comprises a head and at least two holders movably arranged thereon and adapted in one position to clamp between them a prefabricated bead core and in another position to release said bead core. Such bead core placing and positioning apparatuses or means are particularly useful in tire building machines having an expansible tire building drum, for instance a machine of the type described in U.S. application Serial Nos. 87,030 and 87,039. At least some of the previously known bead core placing and positioning means of this kind were moved by the tire building drum upon expansion thereof to the position in which they release the bead core. This, however, is disadvantageous as the tire building drum has to actuate the bead core placing and positioning means through the intermediary of the cord fabric wrapped around the drum, which may be damaged or disarranged in the process.

The present invention has for its object to eliminate this disadvantage by the provision of at least one motor for moving the holders, which motor is mounted on the head of the bead core placing and positioning means.

For a better understanding the invention will be described more in detail in the following, reference being made to the accompanying drawings, in which:

FIG. 1 shows a side elevational view, partly in section, of one embodiment of the invention;
FIG. 2 shows a side elevational view, partly in section, of another embodiment of the invention.

In the embodiment shown in FIG. 1 the bead core placing and positioning means has a head 15 and head 21 each substantially comprising a frame plate 41 and two sleeves 42 and 43 attached thereto which are passed onto two longitudinally displaceable rods 13 and 18 for carrying the bead core placing and positioning means. The sleeve 42 of one placing and positioning means 15 is secured to one rod 13 while the sleeve 43 of this placing and positioning means is movable on the second rod 18. The sleeve 43 of the other placing and positioning means 21 is secured to the second rod 18 while the sleeve 42 of this other placing and positioning means is movable on the one rod 13 passing through it.

Two hubs 44, 45 each carrying one holder arm 16 are rotatably but axially non-movably mounted on the sleeves 42, 43. The portions of said arms remote from the hubs 44, 45 are approximately semicircular and have shallow grooves 6a, 7a in their facing sides.

Over part of their circumference the hubs 44, 45 are formed as gear segments 48, 49 meshing with a common rack 50. This is fixed to a piston rod 51 which penetrates into a pressure medium cylinder 52 secured to the frame plate 41 and which is connected therein to a piston 53 movable in the cylinder. Pressure medium, e.g. air, can be supplied to and allowed to escape from the ends of the cylinder 52 through openings 54, 55 to which are connected hoses (not shown) which lead to a source of pressure medium.

By admission of pressure medium through the opening 44 and simultaneously allowing pressure medium to escape through the opening 45 the piston 43 can be shifted to the right as seen in FIG. 1, the rack 50 turning the gear segments 48, 49 and thus the hubs 44, 45 so that the arms 16 are swung from the position shown by full lines to that indicated by dash and dot lines. By admission of pressure medium through the opening 45 and discharge of pressure medium through the opening 44 the piston 43 can be shifted to the left as seen in FIG. 1, the holder arms 16 being swung from the position indicated by dash and dot lines to that shown by full lines.

At the operation of the tire building machine, a prefabricated bead core is inserted in the grooves 7a of one of the arms 16 while the arms 16 occupy the position indicated by dash and dot lines, whereupon the arms in the manner described are caused to swing to the position shown by full lines so that the bead core is engaged also in the groove 6a in the other holder arm 16. After the strip of cord fabric has been wrapped around the tire building drum (not shown) of the machine the drive rod 18 is caused to move until the core clamped by the holder arms 16 is opposite the groove of the tire building drum. When the tire building drum is expanded, at the same time pressure medium is supplied to the cylinder 52 in such a way that the arms 16 are swung to the position shown by dash and dot lines, gently delivering the bead core to the groove on the tire building drum without any appreciable pressure arising between the holder arms and the cord fabric plies on the tire building drum. The bead core placing and positioning means can then be moved axially away from the tire building drum, placing a new set of bead cores thereon.

FIG. 2 shows a preferred embodiment of the invention. The bead core placing and positioning means shown here has a head which substantially consists of a frame rod 60 which is fixedly connected to two sleeves 61 and 62 corresponding to the sleeves 42 and 43 in the embodiment according to FIG. 1. Secured to the rod 60 is a guide rod 63 on which two guide sleeves 64 and 65 are movable on either side of the rod 60. Said guide sleeves each carry one arm 66 and 67, respectively, to which there is adjustably screwed an arm 68 and 69, respectively, which carries a curved holder element 70 and 71, respectively. The facing concave sides of said holder elements are provided with a groove 70a and 71a, respectively, to accommodate a prefabricated bead core 72.

Also secured to the frame rod 60 is a pressure medium cylinder 73 in which two pistons 74 and 75 are movable toward and away from one another. The pistons 74 and 75 have piston rods 76 and 77 respectively, which outside the cylinder 73 are secured to the arms 66 and 67, respectively. At its middle the cylinder 73 has an opening 78 for admission and discharge of pressure medium, for instance air, and at each end the cylinder 73 has a further opening (not shown) for admission and discharge of pressure medium.

When the bead core placing and positioning means occupies the position shown in FIG. 2 and a bead core 72 is clamped between the holders 70 and 71 the placing and positioning means is moved inwards over the tire building drum (not shown) in the manner described in connection with FIG. 1. Upon expansion of the tire building drum pressure medium is supplied through the opening 78 so that the pistons 74 and 75 are moved apart, thereby moving the holders 70 and 71 away from each other while the guide sleeves 64 and 65 slide on the guide rod 63, whereby the bead core 72 is gently delivered to the expanding tire building drum. After the holders 70 and 71 have been moved apart, the placing and positioning means is moved axially away from the tire building drum whereafter a new bead core 72 can be placed between the holders 70 and 71 which are caused to engage the new bead core by the pistons 74 and 75 being moved towards one another with the aid of pressure medium supplied to the ends of the cylinder 73.

While the invention has been described with reference to the embodiments shown in the drawings it is understood that it is not restricted to these particular embodiments as many modifications may be resorted to without leaving the scope and spirit of the appended claims. It should be observed particularly that for instance in the embodiment according to FIG. 1 complete gears can be provided instead of the gear segments 48 and 49, said complete gears being formed on or connected to the hubs 44 and 45. The gear segments or gears can be formed with teeth suited to mesh with a worm or screw which is either axially movable or rotatable to operate the bead core holders. When a rotary worm or screw is employed an electric motor mounted on the head of the placing and positioning means can be used to drive said worm or screw. As will be readily realized by those skilled in the art, it is possible to use as a motor electric solenoids with armatures, instead of piston and cylinder aggregates.

What we claim is:

1. In a tire building machine having a frame, a tire building drum on said frame, rods mounted on said frame for sliding movement in the direction of the length of said rods and parallel to the axis of said tire drum, and means on said frame connected to said rods for moving said rods, that improvement comprising apparatus for clamping and releasing bead cores to be placed around the tire drum, said apparatus adapted to be mounted on said rods and comprising a head, a plurality of holder means mounted on said head for movement toward each other to one position in which they clamp between them a prefabricated bead core and movement away from each other to another position in which they release the bead core, and motor means mounted on said head connected to said holder means for moving said holder means between said positions.

2. In a tire building machine having a frame, a tire building drum on said frame, rods mounted on said frame for sliding movement in the direction of the length of said rods and parallel to the axis of said tire drum, and means on said frame connected to said rods for moving said rods, that improvement comprising apparatus for clamping and releasing bead cores to be placed around the tire drum, said apparatus adapted to be mounted on said rods and comprising a head, two holder means mounted on said head for swinging movement toward each other to one position in which they clamp between them a prefabricated bead core and movement away from each other to another position in which they release the bead core, a gear means on each of said holder means, rack means meshing with said gear means, and motor means mounted on said head and operating said rack means for swinging said holder means between said positions.

3. An apparatus as claimed in claim 2 in which said motor means comprises a double acting pressure medium piston and cylinder assembly, the cylinder of said aggregate being fixed to said head and the piston of said aggregate being connected to said rack means.

4. In a tire building machine having a frame, a tire building drum on said frame, rods mounted on said frame for sliding movement in the direction of the length of said rods and parallel to the axis of said tire drum, and means on said frame connected to said rods for moving said rods, that improvement comprising apparatus for clamping and releasing bead cores to be placed around the tire drum, said apparatus adapted to be mounted on said rods and comprising a head, two holder means mounted on said head for reciprocation toward each other to one position in which they clamp between them a prefabricated bead core and away from each other to another position in which they release the bead core, a pressure medium cylinder mounted on said head, two pistons movable toward and away from one another in said cylinder and each connected to one of said holder means for reciprocating said holder means between said positions.

References Cited in the file of this patent

UNITED STATES PATENTS

| 1,526,594 | Gammeter | Feb. 17, 1925 |
| 1,606,695 | Cole | Nov. 9, 1926 |
| 1,662,004 | Jenkinson | Mar. 6, 1928 |
| 2,565,071 | Frazier | Aug. 21, 1951 |
| 2,664,937 | Hirsch | Jan. 5, 1954 |
| 2,754,885 | Jefferys | July 17, 1956 |
| 2,790,481 | Beckadolph | Apr. 30, 1957 |

FOREIGN PATENTS

| 895,968 | Germany | Nov. 9, 1953 |